United States Patent
Onimaru et al.

(10) Patent No.: US 12,263,844 B2
(45) Date of Patent: Apr. 1, 2025

(54) ROAD SURFACE EVALUATION APPARATUS

(71) Applicants: Honda Motor Co., Ltd., Tokyo (JP); Pacific Consultants Co., Ltd., Tokyo (JP)

(72) Inventors: Hiroyuki Onimaru, Tokyo (JP); Atsuki Kakinuma, Tokyo (JP); Takeo Tokunaga, Tokyo (JP); Yasuo Oishi, Tokyo (JP); Akira Iihoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/602,022

(22) Filed: Mar. 12, 2024

(65) Prior Publication Data
US 2024/0308528 A1 Sep. 19, 2024

(51) Int. Cl.
*B60W 40/06* (2012.01)
*B60W 40/04* (2006.01)
*B60W 40/107* (2012.01)
*B60W 50/00* (2006.01)

(52) U.S. Cl.
CPC ............ *B60W 40/06* (2013.01); *B60W 40/04* (2013.01); *B60W 40/107* (2013.01); *B60W 2050/0005* (2013.01)

(58) Field of Classification Search
CPC .... B60W 40/04; B60W 40/06; B60W 40/107; B60W 2050/0005
See application file for complete search history.

(56) References Cited

U.S. PATENT DOCUMENTS

| | | | |
|---|---|---|---|
| 2013/0170701 A1 | 7/2013 | Suzuki et al. | |
| 2022/0343522 A1* | 10/2022 | Bi | G06T 17/20 |
| 2024/0135728 A1* | 4/2024 | Ferencz | G01C 21/3407 |

FOREIGN PATENT DOCUMENTS

| | | | |
|---|---|---|---|
| CN | 115476854 A | * | 12/2022 |
| JP | 2002243535 A | | 8/2002 |
| JP | 2013139671 A | | 7/2013 |
| JP | 2019196680 A | | 11/2019 |
| JP | 2022181640 A | | 12/2022 |

OTHER PUBLICATIONS

Japanese Office action; Application 2023-041765; 8 pages; Feb. 4, 2025.

* cited by examiner

*Primary Examiner* — Edwin A Young
(74) *Attorney, Agent, or Firm* — Duft & Bornsen, PC

(57) ABSTRACT

A road surface evaluation apparatus includes a microprocessor and a memory connected to the microprocessor. The memory stores map information including roughness information indicating a roughness of a surface of a road, and the microprocessor is configured to perform: acquiring as driving information of a plurality of vehicles driving on the road, position information of the plurality of vehicles, acceleration information indicating accelerations of the plurality of vehicles, driving image information including a captured image of the surface of the road, and driving sound information indicating driving sound of the plurality of vehicles; evaluating the roughness of the surface of the road based on the driving information of the plurality of vehicles; and updating the roughness information corresponding to the road stored in the memory based on an evaluation result in the evaluating.

10 Claims, 12 Drawing Sheets

ROAD SURFACE EVALUATION APPARATUS

CROSS-REFERENCE TO RELATED APPLICATION

This application is based upon and claims the benefit of priority from Japanese Patent Application No. 2023-041765 filed on Mar. 16, 2023, the content of which is incorporated herein by reference.

BACKGROUND OF THE INVENTION

Field of the Invention

The present invention relates to a road surface evaluation apparatus that evaluates a road surface profile representing unevenness of a road surface.

Description of the Related Art

As an apparatus of this type, there has been conventionally known an apparatus configured to display a roughness index of a road surface calculated based on driving acceleration acquired from driving vehicles (see, for example, JP 2019-196680 A). The apparatus described in JP 2019-196680 displays the crack rate of a road surface detected based on the image captured by an in-vehicle camera on a map together with the roughness index of the road surface so as to allow efficient grasp of the condition of the road surface.

However, the condition of the road surface detected based on the captured image may vary depending on the environment outside the vehicle such as weather. Therefore, if the captured image is used as in the apparatus described in JP 2019-196680 A, the road surface condition may not be accurately evaluated.

SUMMARY OF THE INVENTION

An aspect of the present invention is a road surface evaluation apparatus including a microprocessor and a memory connected to the microprocessor. The memory stores map information including roughness information indicating a roughness of a surface of a road. The microprocessor is configured to perform: acquiring as driving information of a plurality of vehicles driving on the road, position information of the plurality of vehicles, acceleration information indicating accelerations of the plurality of vehicles, driving image information including a captured image of the surface of the road, and driving sound information indicating driving sound of the plurality of vehicles; evaluating the roughness of the surface of the road based on the driving information of the plurality of vehicles; and updating the roughness information corresponding to the road stored in the memory based on an evaluation result in the evaluating.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
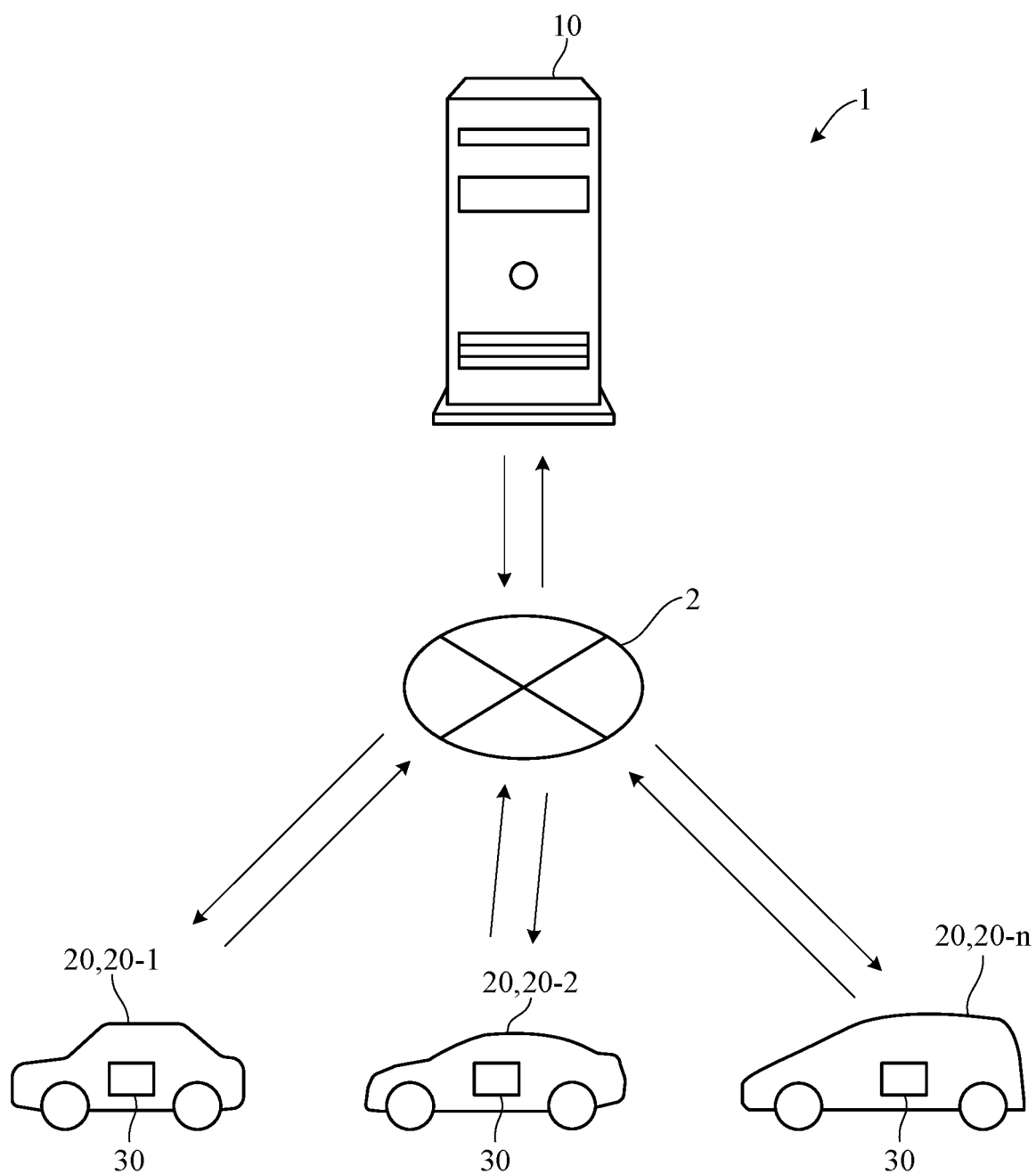
FIG. 1 is a diagram illustrating an example of the configuration of a road surface evaluation system including a road surface evaluation apparatus according to the present embodiment.

An embodiment of the present invention will be described below with reference to FIGS. 1 to 11. The road surface evaluation apparatus according to the present embodiment is an apparatus for evaluating the road surface profile of a road on which a vehicle is driving. FIG. 1 illustrates an example of the configuration of a road surface evaluation system including a road surface evaluation apparatus according to the present embodiment. As illustrated in FIG. 1, a road surface evaluation system 1 includes a road surface evaluation apparatus 10 and in-vehicle terminals 30. The road surface evaluation apparatus 10 includes, for example, a server device. The in-vehicle terminals 30 are configured to communicate with the road surface evaluation apparatus 10 via a communication network 2.

The communication network 2 includes not only public wireless communication networks represented by Internet networks and cell phone networks, but also closed communication networks established for each predetermined administrative region, such as wireless LAN, Wi-Fi (registered trademark), and Bluetooth (registered trademark).

The in-vehicle terminals 30 are installed in vehicles 20. The vehicles 20 include a plurality of vehicles 20-1, 20-2, . . . , and 20-$n$. Note that the vehicles 20 may be manually operated vehicles or automated vehicles. The vehicles 20 may include vehicles of different models and grades.

Figure 2:
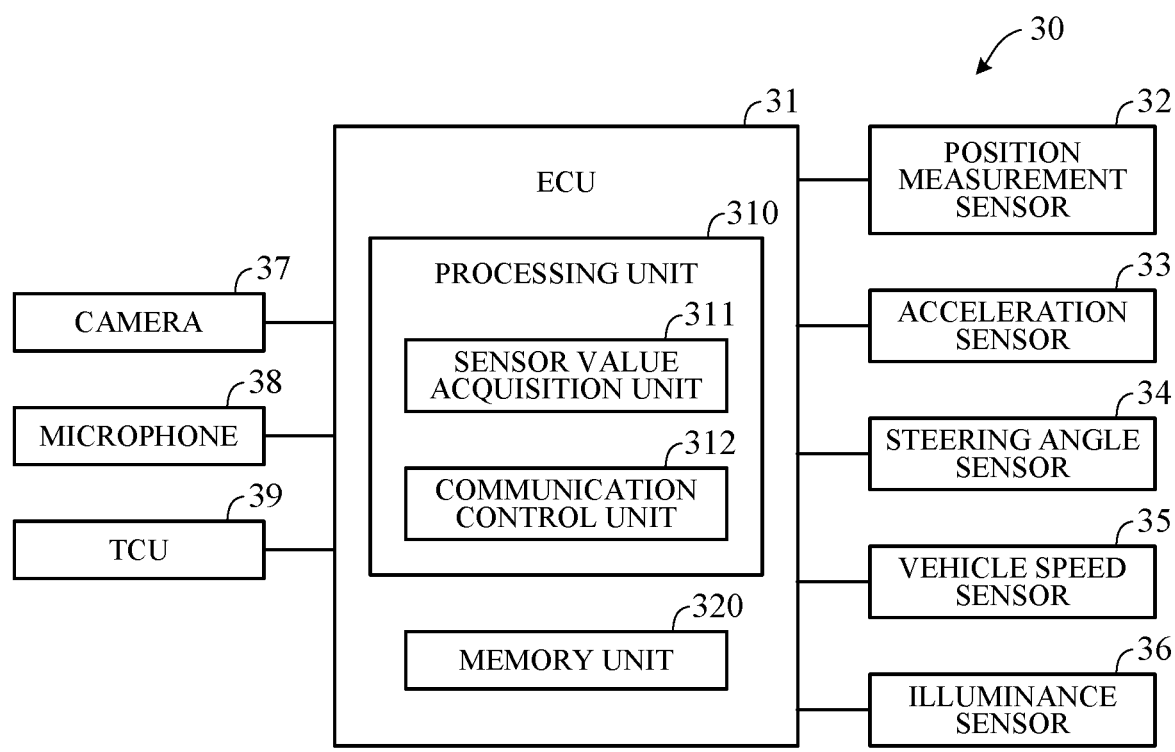
FIG. 2 is a block diagram illustrating key components of an in-vehicle terminal.

FIG. 2 is a block diagram illustrating the key components of the in-vehicle terminal 30 according to the present embodiment. The in-vehicle terminal 30 includes an electronic control unit (ECU) 31, a position measurement sensor 32, an acceleration sensor 33, a steering angle sensor 34, a vehicle speed sensor 35, an illuminance sensor 36, a camera 37, a microphone 38, and a telematic control unit (TCU) 39.

The position measurement sensor 32 is, for example, a GPS sensor, which receives positioning signals transmitted from GPS satellites and detects the absolute position (e.g., latitude and longitude) of the vehicle 20. The position measurement sensor 32 includes not only GPS sensors but also sensors that use radio waves transmitted from satellites in various countries, known as GNSS satellites, including quasi-zenith orbit satellites. Hereinafter, information indicating the position of the vehicle detected by the position measurement sensor 32 is referred to as position information. The position information includes information indicating the time when the vehicle 20 has driven the position (hereinafter referred to as driving time information).

The acceleration sensor 33 detects the acceleration of the vehicle 20 in the left-right directions, that is, lateral acceleration. Note that the acceleration sensor 33 may be configured to detect acceleration in the front-back direction and vertical direction as well as lateral acceleration of the vehicle 20. Hereinafter, the information of the acceleration detected by the acceleration sensor 33 is referred to as acceleration information or vehicle vibration data. The steering angle sensor 34 detects the steering angle of the steering wheel (not shown) of the vehicle 20. The vehicle speed sensor 35 detects the vehicle speed of the vehicle 20.

The illuminance sensor 36 includes a light receiving element and detects brightness (illuminance) of light incident on the light receiving element. The illuminance sensor 36 is installed outside the vehicle 20 (for example, on the roof) or inside the vehicle 20 (on the dashboard) so that it can detect the illuminance around the vehicle 20. Since light passing through the windshield is somewhat attenuated by the glass, in a case where the illuminance sensor 36 is installed inside the vehicle 20, the sensor value may be corrected in consideration of the attenuation amount.

The camera 37 includes an imaging device (image sensor) such as a CCD or a CMOS. The camera 37 continuously images a space in front of the vehicle 20 to acquire image data. The camera 37 is mounted at a predetermined position (front portion) of the vehicle 20 such that the road surface on which the vehicle 20 is driving is included in the imaging range. Hereinafter, the captured image data acquired by the camera 37 is referred to as road image data or simply a road image. The camera 37 may be a monocular camera or a stereo camera.

The microphone 38 converts the input sound into an electrical signal and outputs it. The microphone 38 is mounted at a predetermined position on the vehicle 20 so as to be capable of collecting driving sound of the vehicle 20. Hereinafter, the data of the driving sound output from the microphone 38 is referred to as driving sound data. Note that the microphone 38 may be mounted inside or outside the vehicle. Furthermore, the microphone 38 may include a single microphone or may include a microphone array including a plurality of microphones.

As illustrated in FIG. 2, the ECU 31 includes a computer including a processing unit 310 such as a CPU (processor), a memory unit 320 such as ROM and RAM, and other peripheral circuits such as I/O interfaces not illustrated. The processing unit 310 functions as a sensor value acquisition unit 311 and a communication control unit 312 by executing programs stored in the memory unit 320 in advance.

The sensor value acquisition unit 311 acquires the detection value of the position measurement sensor 32 (position information) and the detection value of the acceleration sensor 33 (vehicle vibration data) at a predetermined sampling cycle. The communication control unit 312 transmits the information acquired by the sensor value acquisition unit 311 (hereinafter referred to as driving information) to the road surface evaluation apparatus 10 at a predetermined cycle via the TCU 36, together with the vehicle ID that allows the vehicle 20 to be identified.

The driving information acquired by the sensor value acquisition unit 311 further includes the detection value of the vehicle speed sensor 35, that is, the measured driving speed of the vehicle 20 (hereinafter referred to as driving speed information), the detection value of the illuminance sensor 36 (hereinafter referred to as illuminance information), the detection value of the camera 37 (road image data), and the detection value of the microphone 38 (driving sound data). The driving information may include the detection value of the steering angle sensor 34, that is, the measured steering angle of the steering wheel of the vehicle 20 (hereinafter referred to as steering angle information). The steering angle information may be configured to use information acquired by a yaw rate sensor (not shown) installed in the vehicle 20 (hereinafter referred to as yaw rate sensor information).

The road surface evaluation apparatus 10 detects the unevenness of the road surface, that is, the road surface roughness (hereinafter also referred to as a road surface profile), based on the values detected by the acceleration sensor 33 (vehicle vibration data) of the vehicle 20 (in-vehicle terminal 30). The detected road surface profile information is output to, for example, a terminal owned by a road management company or the like, and is used as reference data by the road management company when considering whether or not repairs are necessary. Specifically, the detected values of the acceleration sensor are used to evaluate the road surface profile.

Figure 3:
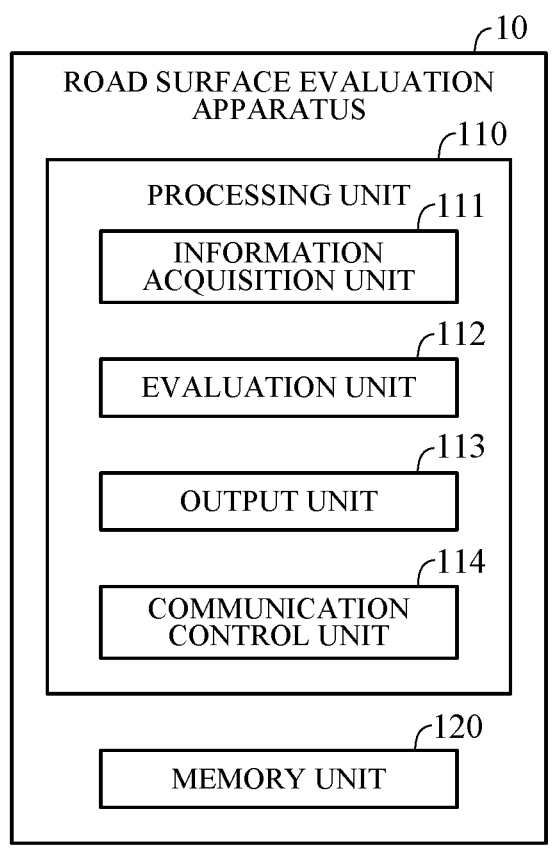
FIG. 3 is a block diagram illustrating key components of the road surface evaluation apparatus according to the present embodiment.

FIG. 3 is a block diagram illustrating the key components of the road surface evaluation apparatus 10 according to the present embodiment. The road surface evaluation apparatus 10 is configured to include a computer including a processing unit 110, such as a CPU, a memory unit 120 such as ROM and RAM, and other peripheral circuits such as I/O interfaces not illustrated. The memory unit 120 stores map information including road maps, and various kinds of information processed by the processing unit 110.

The processing unit 110 executes the programs stored in the memory unit 120, thereby functioning as an information acquisition unit 111, an evaluation unit 112, an output unit 113, and a communication control unit 114.

The information acquisition unit 111 receives driving information from the in-vehicle terminals 30 of the vehicles 20 driving on the road via the communication control unit 114. Note that the information acquisition unit 111 can identify the vehicle 20 that is the transmission source of the driving information by the vehicle ID associated with the driving information.

The information acquisition unit 111 stores driving information received from the plurality of vehicles 20 (in-vehicle terminals 30) in the memory unit 120 in time series. Hereafter, the driving information stored in time series in the memory unit 120 is referred to as time-series driving information. The information acquisition unit 111 also acquires map information from the memory unit 120, including information on the road on which the vehicles 20 are driving. Furthermore, the information acquisition unit 111 acquires weather information corresponding to the driving position and driving time of the vehicle 20 indicated by the driving information of the vehicle 20 from an external information distribution server (not illustrated) that distributes the weather information. The information acquisition unit 111 stores weather information in the memory unit 120 in association with driving information of the vehicle 20.

The evaluation unit 112 evaluates the amount of unevenness (depth or height) of the road surface, or road surface roughness, based on the driving information of the plurality of vehicles 20 acquired by the information acquisition unit 111 within a predetermined period. More specifically, the evaluation unit 112 calculates the road surface roughness value indicating the degree of road surface roughness based on the lateral accelerations of the plurality of vehicles 20 acquired by the information acquisition unit 111 within a predetermined period. The road surface roughness values are, for example, values expressed in terms of the International Roughness Index (IRI), which is an international index. Hereinafter, the road surface roughness values may be simply referred to as roughness values.

Figure 4A:
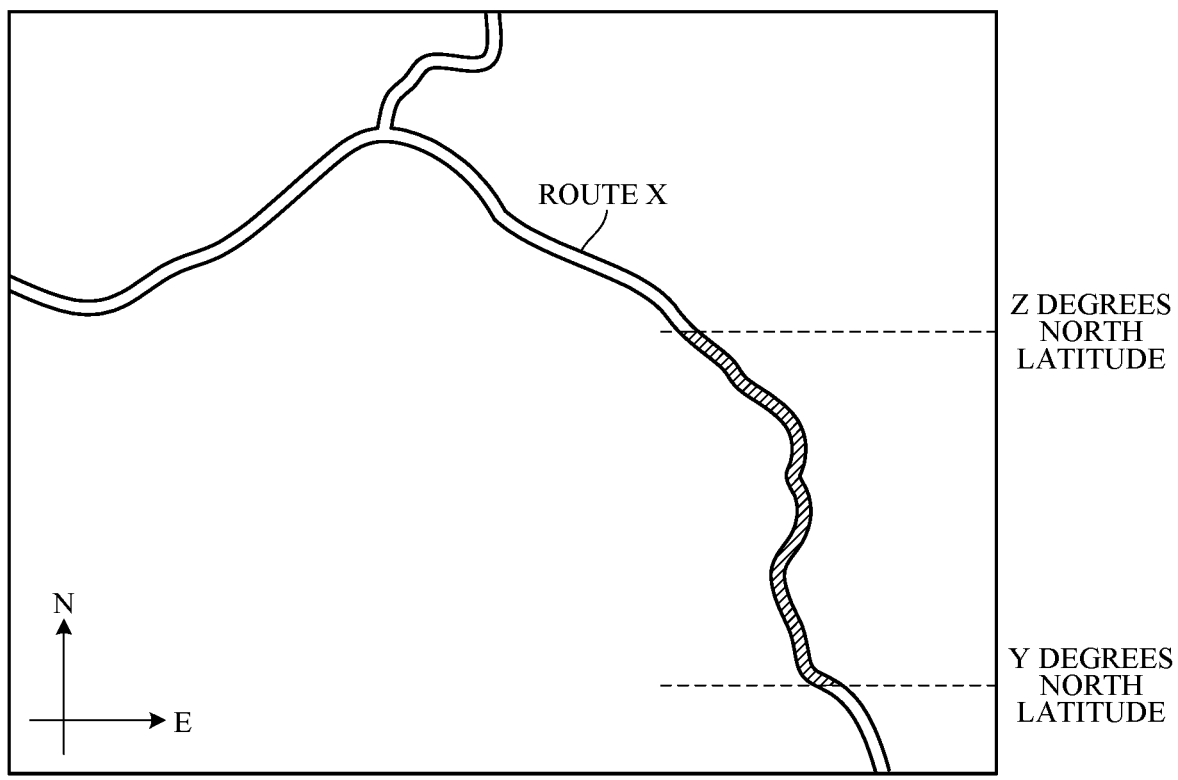
FIG. 4A is a diagram illustrating an example of a map of a road on which vehicles are driving.

FIG. 4A is a diagram illustrating an example of a map of the road on which the vehicles 20 are driving. FIG. 4A illustrates the predetermined road to be evaluated for the road surface roughness (latitude Y to Z on National Route X). In FIG. 4A, the upper direction corresponds to the north direction, and the right direction corresponds to the east direction. The predetermined road to be evaluated for road surface roughness (hereinafter referred to as the road to be evaluated) can be designated by a user (for example, a road management company). More specifically, information that can identify the road to be evaluated, such as the name and position (latitude and longitude) of the road in the section to be evaluated, is transmitted from a terminal of a road management company or the like to the road surface evaluation apparatus 10, whereby the road to be evaluated is designated. In a case where the road to be evaluated has a plurality of lanes on each side, the lane to be evaluated for road surface roughness may be designated by the user. In addition, the road to be evaluated may be designated by the distance from the start point coordinates.

Figure 4B:
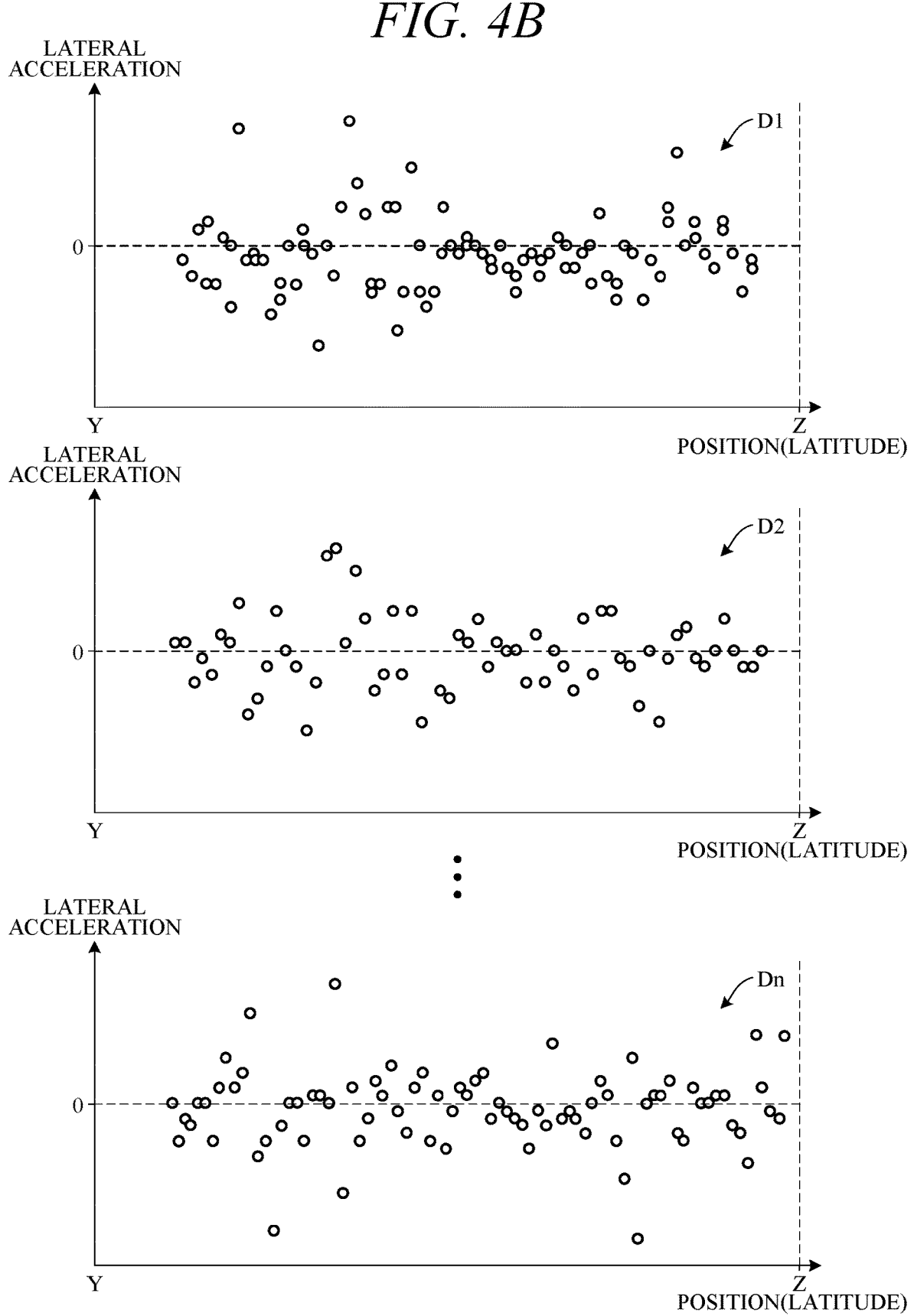
FIG. 4B is a diagram illustrating an example of driving information.

The driving information acquired at a predetermined sampling cycle by the in-vehicle terminal 30 is transmitted to the road surface evaluation apparatus 10 via the communication control unit 312. FIG. 4B illustrates an example of time-series driving information obtained by the road surface evaluation apparatus 10 from the in-vehicle terminal 30 of the vehicle 20-1 driving on the road to be evaluated (latitude Y to Z on National Route X) in FIG. 4A. The horizontal axis in the figure is the position (latitude) of the vehicles 20-1 in the driving direction along the traveling lane, and the vertical axis is the lateral acceleration of the vehicles 20-1. The characteristics D1, D2, . . . , and Dn represent time-series driving information acquired when the vehicle 20-1 drives on the road to be evaluated for the first, second, . . . , and nth time, respectively.

In general, the greater the amount of unevenness of the road surface, the greater the lateral acceleration of the vehicles 20, and the road surface roughness values and lateral acceleration have a certain correlation. The evaluation unit 112 uses this correlation information (hereafter referred to as a road surface condition inference model or simply an inference model) to calculate the road surface roughness value corresponding to the vehicle position on the road from the lateral acceleration.

Figure 5A:
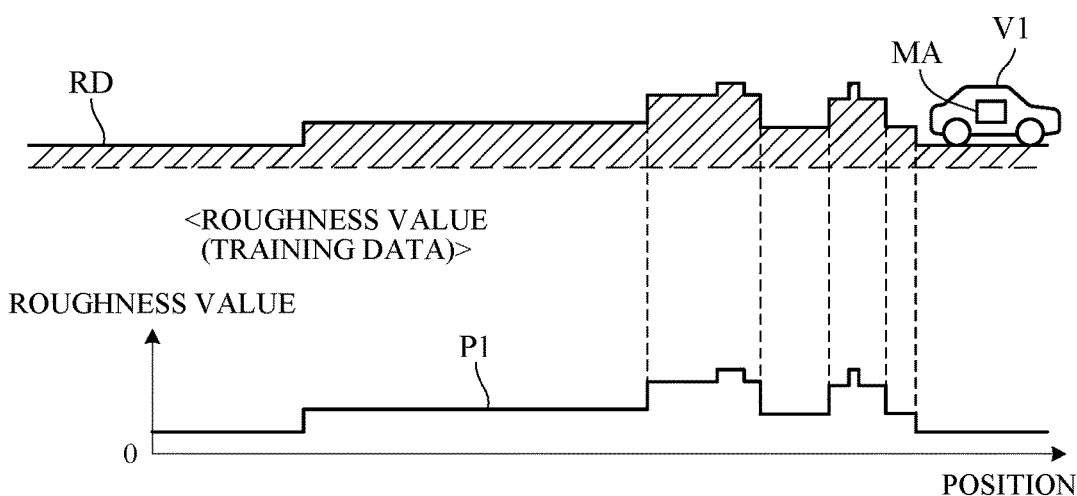
FIG. 5A is a diagram illustrating how to derive correlation between road surface roughness values and lateral acceleration.
Figure 5B:
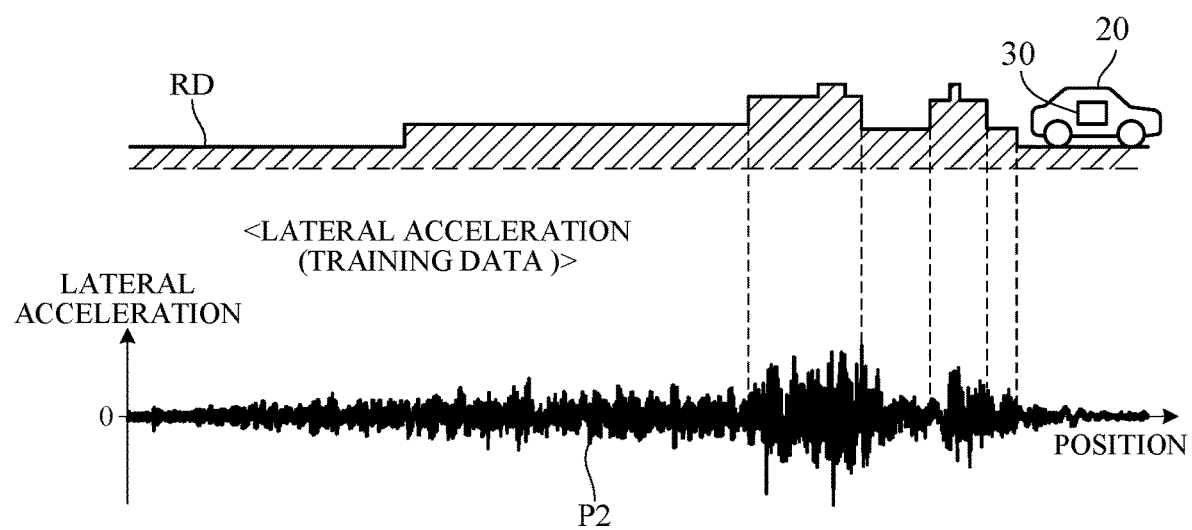
FIG. 5B is a diagram illustrating how to derive the correlation between the road surface roughness values and the lateral acceleration.

First, the evaluation unit 112 performs machine learning (machine learning LN in FIG. 7 to be described later) using the pre-measured road surface roughness value and the lateral acceleration as training data to generate a road surface condition inference model. FIGS. 5A and 5B illustrate the training data for road surface roughness values and lateral acceleration, respectively. A vehicle V1 illustrated in FIG. 5A is a dedicated vehicle including a measuring instrument MA that measures road surface roughness. The measuring instrument MA measures the road surface roughness values of the road RD when the vehicle V1 is driving on a predetermined road (such as a course for measurement) RD. A characteristic P1 in FIG. 5A represents the road surface roughness value measured at this time, that is, the road surface roughness value used as the training data.

FIG. 5B illustrates the vehicles 20 in FIG. 1 driving on the same road RD as that in FIG. 5A. A characteristic P2 in FIG. 5B represents the lateral acceleration detected by the acceleration sensor 33 provided in the vehicle 20 while the vehicle 20 is driving on a predetermined road RD at a predetermined driving speed (hereinafter referred to as a reference driving speed) Vref, that is, the lateral acceleration used as training data.

The training data for road surface roughness values and lateral acceleration may be stored in the memory unit 120 of the road surface evaluation apparatus 10 or in an external memory device. The evaluation unit 112 executes machine learning using the training data for the road surface roughness value and the lateral acceleration read from the memory unit 120 or an external memory device to generate a road surface condition inference model. The longitudinal acceleration, front/rear acceleration, and steering angle may be added as training data for machine learning.

The evaluation unit 112 calculates the road surface roughness value of the road to be evaluated based on the driving information acquired while the vehicle 20 is driving on the road to be evaluated using the generated road surface condition inference model.

The output unit 113 executes processing of storing the road surface roughness information evaluated by the evaluation unit 112, that is, the road surface roughness value calculated by the evaluation unit 112, in association with the road information included in the map information of the memory unit 120 (hereinafter referred to as map information update processing). When the road surface roughness value corresponding to the road to be evaluated is already stored, the output unit 113 updates the road surface roughness value with the road surface roughness value calculated by the evaluation unit 112.

Figure 6:
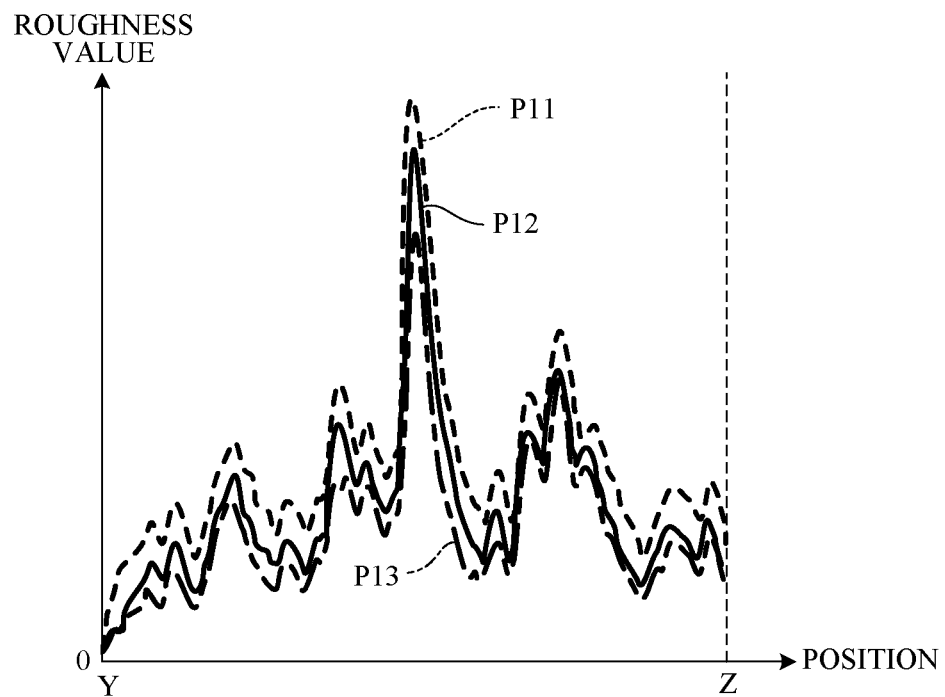
FIG. 6 is a diagram illustrating an example of the road surface profile information.

The output unit 113 also outputs the road surface roughness information evaluated by the evaluation unit 112 in association with the road information acquired by the information acquisition unit 111. The information output at this time is referred to as road surface profile information. When the output unit 113 receives an instruction to output the road surface profile from a terminal of a road management company or the like via the communication network 2, it outputs the road surface profile information to the terminal from which the output instruction was transmitted or to a predetermined output destination terminal. The road surface profile information is information that can be displayed on a display device such as a display, and users can check road surface profiles by displaying the road surface profile information on a display included in the user's terminal. FIG. 6 illustrates an example of the road surface profile information. A characteristic P11 in FIG. 6 represents the road surface roughness value calculated based on the time-series driving information D1 in FIG. 4B. A characteristic P12 in FIG. 6 represents the road surface roughness value calculated based on the time-series driving information D2 in FIG. 4B. A characteristic P13 in FIG. 6 represents the road surface roughness value calculated based on the time-series driving information Dn in FIG. 4B.

By the way, the detection value of the acceleration sensor 33 included in the driving information of the vehicle 20 may include noise and the like caused by the external environment of the vehicle 20, such as weather. Therefore, even when the vehicles 20 drive on the same road, as illustrated in FIG. 6, different road surface roughness values are calculated for different external environments during driving. In this case, the road surface condition may not be accurately evaluated. Therefore, in order to address such a problem, the evaluation unit 112 evaluates the road surface roughness as follows.

Figure 7:
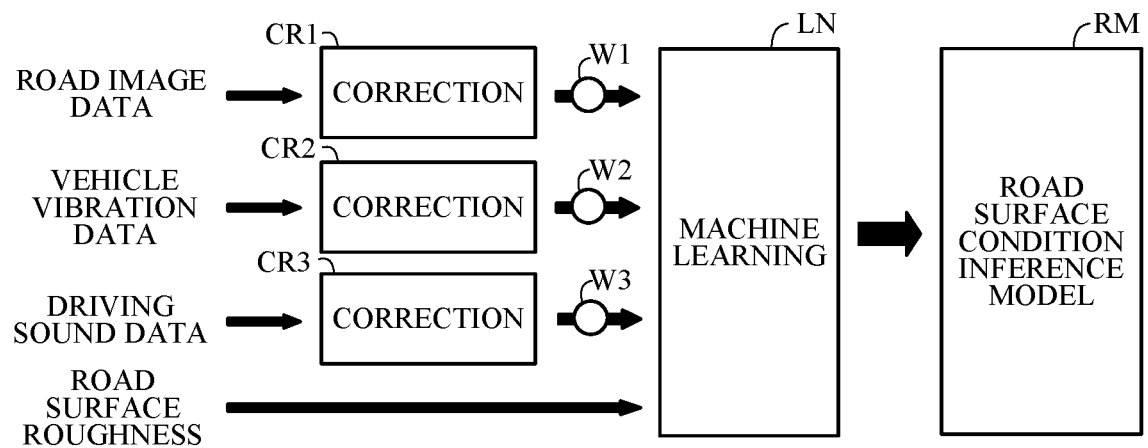
FIG. 7 is a diagram for illustrating updating of a road surface condition inference model

FIG. 7 is a diagram for illustrating updating of the road surface condition inference model. The model RM in FIG. 7 is a road surface condition inference model generated by the machine learning LN using the training data in FIGS. 5A and 5B. As illustrated in FIG. 7, the evaluation unit 112 inputs the vehicle vibration data acquired by the information acquisition unit 111 to the machine learning LN to update the inference model RM. At this time, the evaluation unit 112 inputs the road image data and the driving sound data detected at the same timing as that of the vehicle vibration data to the machine learning LN together with the vehicle vibration data. In this manner, the inference accuracy of the inference model RM can be improved by inputting the road image data and the driving sound data together with the vehicle vibration data to the machine learning LN.

On the other hand, the vehicle vibration data, the road image data, and the driving sound data change depending on the driving speed of the vehicle 20 even if the vehicle 20 drives on the same road in the same environment. Therefore, if the vehicle vibration data, the road image data, and the driving sound data are directly input to the machine learning LN, a desired road surface condition inference model RM may not be acquired. In consideration of this point, as illustrated in FIG. 7, the evaluation unit 112 make corrections CR1, CR2, and CR3 based on the driving speed of the vehicle 20 on the road image data, the vehicle vibration data, and the driving sound data.

Figure 8A:
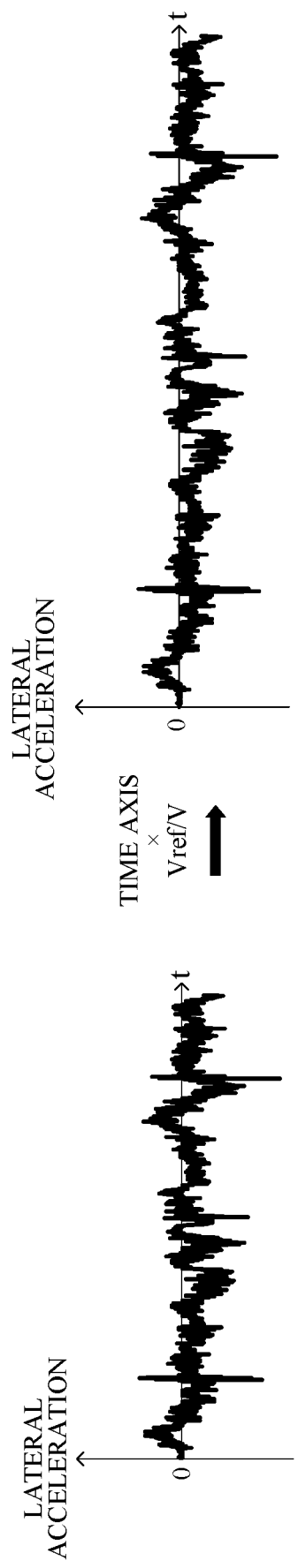
FIG. 8A is a diagram for illustrating correction on vehicle vibration data.
Figure 8B:
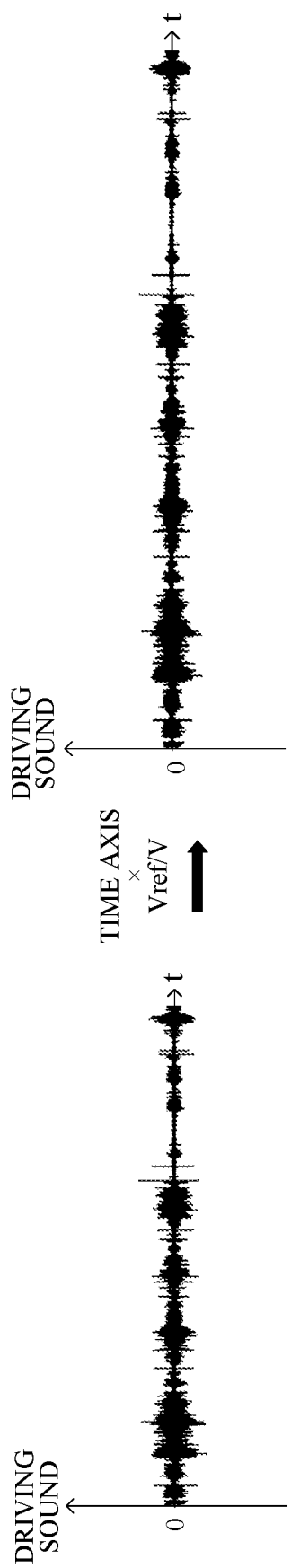
FIG. 8B is a diagram for illustrating correction on driving sound data

FIG. 8A is a diagram for illustrating correction CR2 on the vehicle vibration data. FIG. 8A illustrates how the vehicle vibration data before correction, that is, the vehicle vibration data included in the driving information acquired by the information acquisition unit 111 (left figure), is multiplied by the correction factor on the time axis to obtain the corrected vehicle vibration data (right figure). The correction factor is a value obtained by dividing the reference driving speed Vref by the driving speed indicated by the driving speed information acquired by the information acquisition unit 111, that is, the driving speed V of the vehicle 20 at the time when the vehicle vibration data was detected. FIG. 8B is a diagram for illustrating correction CR3 on the driving sound data. The correction of the driving sound data is performed in the same manner as the correction of the vehicle vibration data. Specifically, the driving sound data before correction, that is, the driving sound data included in the driving information acquired by the information acquisition unit 111 (left figure), is multiplied by the correction factor (Vref/V) on the time axis to obtain the corrected driving sound data (right figure).

Figure 9A:
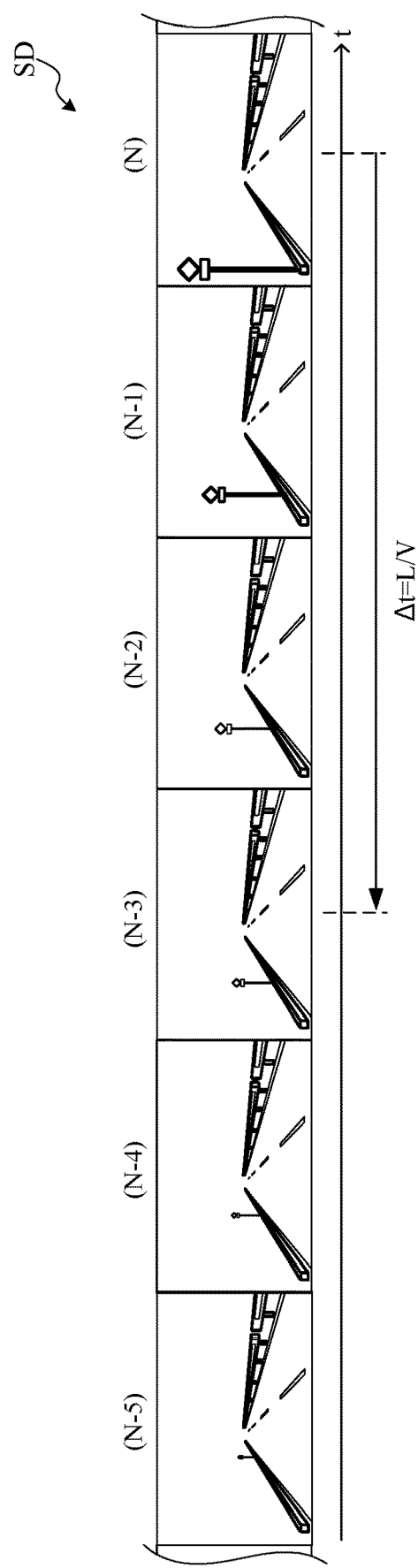
FIG. 9A is a diagram for illustrating correction on road image data
Figure 9B:
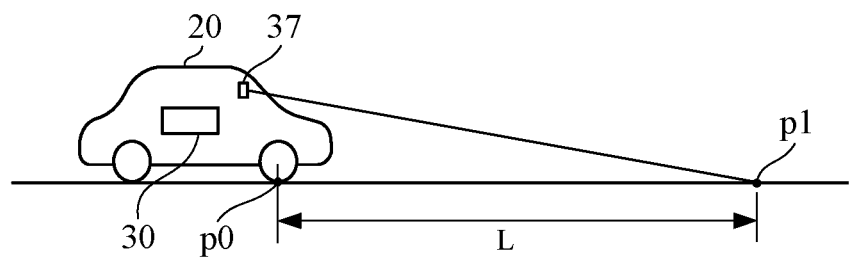
FIG. 9B is a diagram for illustrating a position of the road surface imaged by the camera.

FIG. 9A is a diagram for illustrating correction CR1 on the road image data. As illustrated in FIG. 9A, road image data SD is a moving image data including a plurality of frames. In the figure, numbers in parentheses represent frame numbers. The frame N is the current frame, and the frames N-1, . . . , and N-5 are past frames consecutive to the frame N. FIG. 9B is a diagram for illustrating the position of the road surface imaged by the camera 37 of the in-vehicle terminal 30. As illustrated in FIG. 9B, position P1 of the road surface imaged by the camera 37 is located a distance L ahead of the vehicle 20. The distance L is calculated based on the position and orientation of the camera 37 with respect to the road surface. The road surface (more specifically, the road surface immediately under the tires of the vehicle 20) at the driving position of the vehicle 20 at the time when the current frame N was acquired by the camera 37 is included in the frame (the frame N-3 in the example in FIG. 9A) acquired before the current frame N by a predetermined time Δt (=L/V). Therefore, the evaluation unit 112 acquires road image data with the time axis shifted past by Δt as corrected road image data.

In addition, as illustrated in FIG. 7, the evaluation unit 112 attaches weights W1, W2, W3 to the road image data, the vehicle vibration data, and the driving sound data, which have been corrected based on the driving speed of the vehicle 20, respectively. The calculation of the weights W1, W2, and W3 will be described.

The evaluation unit 112 calculates a weight W1 to be given to the road image data based on the illuminance information included in the driving information acquired by the information acquisition unit 111. Specifically, the evaluation unit 112 determines the brightness (illuminance) around the vehicle 20 based on the illuminance information, and makes the weight W1 smaller when the illuminance is equal to or less than a predetermined value than when the illuminance is greater than the predetermined value. The evaluation unit 112 may decrease the weight W1 as the illuminance decreases. In addition, the image recognition accuracy (recognition accuracy of the road surface condition based on the camera image) is lower when the driving time period is in bad weather than when in good weather. Therefore, the evaluation unit 112 may recognize the weather at the driving position during the driving time period of the vehicle 20 based on the weather information acquired by the information acquisition unit 111, and may decrease the weight W1 when the weather is bad than when the weather is good. The bad weather is weather that lowers the image recognition accuracy, and is, for example, rainfall, snowfall, snow cover, or fog.

In addition, the evaluation unit 112 calculates the weight W2 to be attached to the vehicle vibration data based on the driving speed of the vehicle 20. The vibration of the vehicle 20 caused by the unevenness of the road surface changes depending on the driving speed of the vehicle 20. Specifically, the higher the driving speed, the greater the vibration of the vehicle caused by the unevenness of the road surface. In consideration of this point, the evaluation unit 112 decreases the weight W2 as the driving speed of the vehicle 20 increases.

The evaluation unit 112 also calculates the weight W3 of the driving sound data based on the weather during the driving time period of the vehicle 20. For example, when it is raining during the driving time period, noise due to rain sound or splashing water may be included in the driving sound data. In consideration of this point, the evaluation unit 112 determines whether or not noise caused by the weather is included in the driving sound data based on the weather during the driving time period of the vehicle 20. Then, the evaluation unit 112 makes the weight W3 smaller when noise is included than when noise is not included.

The evaluation unit 112 periodically or intermittently repeats the machine learning as illustrated in FIG. 7 to grow the road surface condition inference model RM. For example, the evaluation unit 112 executes machine learning as illustrated in FIG. 7 every predetermined period or every time a predetermined amount of new driving information corresponding to the road to be evaluated is accumulated in the memory unit 120. Alternatively, the processing is executed based on the user instruction input via the communication control unit 114.

Figure 10:
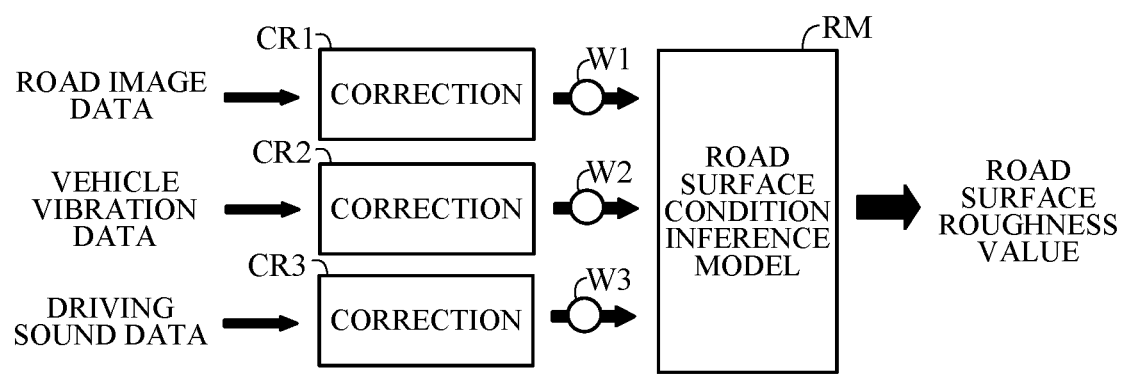
FIG. 10 is a diagram for illustrating calculation of the road surface roughness value using the road surface condition inference model in FIG. 7.

FIG. 10 is a diagram for illustrating the calculation of the road surface roughness value using the road surface condition inference model RM in FIG. 7. The evaluation unit 112 inputs vehicle vibration data, road image data, and driving sound data acquired while the vehicle 20 is driving on the road to be evaluated to the road surface condition inference model RM, and calculates the road surface roughness value of the road to be evaluated. At this time, as illustrated in FIG. 10, the evaluation unit 112 applies corrections CR1, CR2, and CR3 and attach weights W1, W2, and W3 to the vehicle vibration data, the road image data, and the driving sound data, and then inputs these data to the road surface condition inference model RM. As a result, the road surface roughness value can be accurately calculated without being affected by the driving speed of the vehicle 20 or the external environment.

Figure 11:
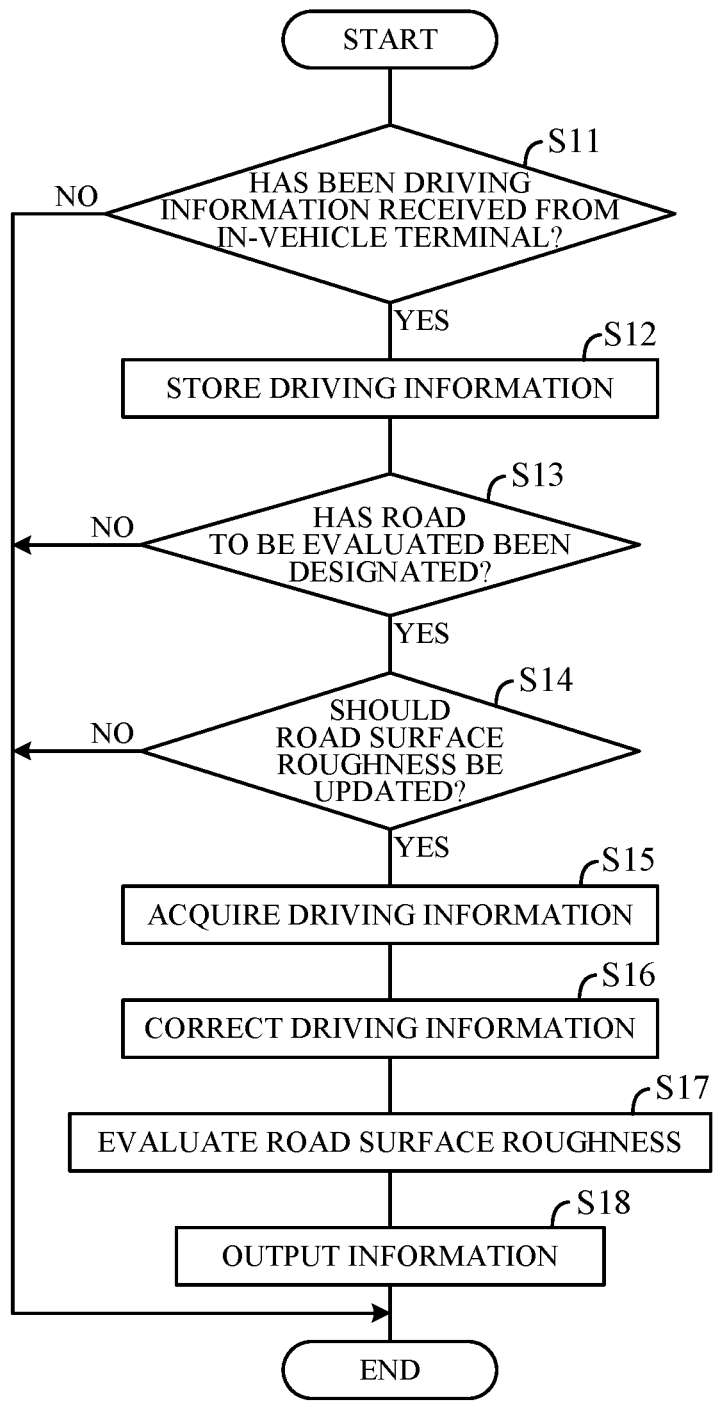
FIG. 11 is a flowchart illustrating an example of processing executed by the processing unit in FIG. 3.

FIG. 11 is a flowchart illustrating an example of processing executed by the processing unit 110 (CPU) of the road surface evaluation apparatus 10 (map information update processing) according to a predetermined program. The processing illustrated in this flowchart is repeated at a predetermined cycle while the road surface evaluation apparatus 10 is running. First, in step S11, it is determined whether driving information has been received from any of the in-vehicle terminals 30 of the vehicles 20. If NO in step S11, the processing ends. If YES in step S11, in step S12, the vehicle information received in step S11 is stored in the memory unit 120. In step S13, it is determined whether the road to be evaluated is designated by the user.

If NO in step S13, the processing ends. If YES in step S13, it is determined in step S14, whether or not to update the road surface roughness value included in the map information in the memory unit 120. More specifically, it is determined whether or not a predetermined period has elapsed from the time of the previous update (the time of the previous execution of step S18). Note that it may be determined whether or not a predetermined amount of new driving information corresponding to the road to be evaluated has been accumulated in the memory unit 120. It may also be determined whether or not an update instruction has been received from a terminal of a road management company or the like via the communication network 2.

If NO in step S14, the processing ends. If YES in step S14, driving information of the vehicle 20 corresponding to the road to be evaluated is acquired from the memory unit 120 in step S15. In step S16, corrections CR1, CR2, and CR3 are applied and weights W1, W2, and W3 are attached to the vehicle vibration data, the road image data, and the driving sound data included in the driving information acquired in step S15. In step S17, the road surface roughness is evaluated. Specifically, the vehicle vibration data, the road image data, and the driving sound data corrected and weighted in step S16 are input to the road surface condition inference model RM to calculate the road surface roughness value. In step S18, the road surface roughness value calculated in step S17 is stored in association with the road information included in the map information in the memory unit 120. As a result, the road surface roughness value corresponding to the road to be evaluated included in the map information is updated.

According to the embodiment of the present invention, the following effects can be achieved.

(1) The road surface evaluation apparatus 10 includes: an information acquisition unit 111 configured to acquire position information of a plurality of vehicles 20 driving on a road, acceleration information indicating accelerations of the plurality of vehicles 20, driving image information including captured images of the road surface, and driving sound information indicating driving sound of the plurality of vehicles 20 as driving information of the plurality of vehicles 20; a memory unit 120 configured to store map information including roughness information indicating the road surface roughness; an evaluation unit 112 configured to evaluate the road surface roughness based on the driving information of the plurality of vehicles 20 acquired by the information acquisition unit 111; and an output unit 113 configured to update the roughness information corresponding to the road stored in the memory unit 120 based on the evaluation result of the evaluation unit 112. The information acquisition unit 111 acquires external environment information indicating the external environment of the plurality of vehicles 20 driving on a road. The evaluation unit 112 attaches weights to the acceleration information, the driving image information, and the driving sound information used to evaluate the road surface roughness. The evaluation unit 112 changes the weights attached to the acceleration information, the driving image information, and the driving sound information based on the external environment information acquired by the information acquisition unit 111. This allows accurate evaluation of the condition of the road surface regardless of the external environment.

(2) The external environment information includes illuminance information indicating illuminance outside the plurality of vehicles 20 driving on the road. When the illuminance indicated by the illuminance information indicates a predetermined value or less, the evaluation unit 112 attaches a smaller weight to the driving image information than when the illuminance is larger than the predetermined value. This allows accurate evaluation of the condition of the road surface regardless of the brightness outside the vehicle 20.

(3) The external environment information includes weather information indicating weather when the plurality of vehicles 20 are driving on the road. When the weather indicated by the weather information is bad, the evaluation unit 112 attaches a smaller weight to the driving image information than when the weather is not bad. Bad weather includes rainfall, snowfall, snow cover, or fog. This allows accurate evaluation of the condition of the road surface regardless of the weather when the vehicle 20 is driving.

(4) The information acquisition unit 111 further acquires, as driving information, driving speed information indicating the driving speeds of the plurality of vehicles calculated from the temporal transitions of the position information of the plurality of vehicles 20, or measured driving speeds of the plurality of vehicles transmitted from the plurality of vehicles 20. The evaluation unit 112 removes noise included in the driving sound information according to the speed band by spectrum analysis based on the driving speed information or the measured driving speed. More specifically, the evaluation unit 112 classifies the driving sound information of the plurality of vehicles 20 into speed bands based on the driving speed information or the measured driving speed corresponding to each vehicle, and performs noise removal using spectrum analysis on each of the driving sound information corresponding to each speed band. Then, the evaluation unit 112 uses the driving sound information from which the noise has been removed to evaluate the road surface roughness. As a result, noise included in the driving sound used to evaluate the road surface roughness can be appropriately removed according to the driving speed of the vehicle 20. As a result, the road surface condition can be accurately evaluated.

The above embodiment can be modified into various forms. Modifications are described below.

In the above embodiment, the evaluation unit 112 inputs the vehicle vibration data acquired by the information acquisition unit 111 to the machine learning LN to update the inference model RM. Normally, even when a plurality of vehicles 20 drive on the same road, the road surface roughness values calculated by the evaluation unit 112 may differ when the models or grades of the vehicles 20 are different. The reason for this is that the suspension, tires, and other components installed in each vehicle 20 that affect the vehicle's motion are different for each model and grade. In consideration of this point, the evaluation unit may correct the vehicle vibration data included in the driving information of each vehicle 20 according to the model or grade of each vehicle 20 and then input the corrected data to the machine learning LN. In general, the lower the shock-absorbing performance (vertical shock absorption performance) of the suspension and tires, the more easily shocks and vibrations caused by uneven road surfaces are transmitted to the vehicle, and the greater the lateral acceleration detected by the acceleration sensors 33 in the vehicles 20. Usually, the shock-absorbing performance of suspension and tires increases with the grade between the same models, and with the ride comfort between different models. This causes variation in the lateral acceleration detected in the vehicles 20, even when the vehicles 20 drive on the same road. Therefore, the information acquisition unit 111 may identify the model and grade of the vehicle 20 based on the vehicle ID (for example, the chassis number) of the vehicle 20 associated with the driving information, recognize the shock-absorbing performance of the suspension and tires based on the identified vehicle model and grade, and attach more weights based on the corresponding shock-absorbing performance to the vehicle vibration data the higher the shock-absorbing performance. Specifically, it may decrease the weight attached to the vehicle vibration data the lower the shock-absorbing performance.

The above embodiment describes an example in which the evaluation unit 112 evaluates the road surface roughness. However, the evaluation unit may evaluate the condition of the road surface other than the road surface roughness. That is, data representing other condition of the road surface may be input to the road surface condition inference model RM. Other conditions of the road surface are, for example, cracking ratio of the road surface, rutting, flatness, potholes, step, dry road surface, wet road surface, snowy road surface, and frozen road surface. The road surface evaluation apparatus 10 may use a maintenance control index (MCI) instead of the IRI as an index indicating the road surface roughness.

In the above embodiment, the information acquisition unit 111 as the driving information acquisition unit acquires the detection value of the vehicle speed sensor 35 as the driving speed information. However, the driving information acquisition unit may calculate the driving speed of the vehicle 20 based on the temporal transition of the position information of the vehicle 20 and acquire the calculation result as the driving speed information.

In the above embodiment, as illustrated in FIG. 7, the evaluation unit 112 performs the correction CR2 and the correction CR3 based on the driving speed on the vehicle vibration data and the driving sound data. However, the evaluation unit may perform machine learning on the vehicle vibration data and the driving sound data for each speed band instead of performing correction based on the driving speed. Specifically, the vehicle vibration data and the driving sound data may be classified by speed band based on the driving speed of the vehicle 20 at the time when the vehicle vibration data and the driving sound data are detected, and the vehicle vibration data and the driving sound data corresponding to each speed band may be input to the machine learning LN prepared for each speed band.

In the above embodiment, the information acquisition unit 111 as an environment information acquisition unit acquires weather information indicating the weather when the vehicle 20 is driving on a road, and the evaluation unit 112 recognizes the weather during the driving time period of the vehicle 20 based on the weather information, and attaches a weight to the driving sound data using the weight W3 calculated based on the weather. However, instead of attaching a weight to the driving sound data, the evaluation unit may remove noise included in the driving sound information by spectrum analysis based on the weather information. More specifically, the evaluation unit may use spectrum analysis to detect noise (for example, sound of splashing water) corresponding to the weather during the driving time period included in the driving sound data and remove the detected noise from the driving sound data. Furthermore, in a case where the machine learning is performed for each speed band as described above, the evaluation unit may remove noise included in the driving sound data according to the speed band corresponding to the driving speed of the vehicle 20 by spectrum analysis based on the driving speed information.

In the above embodiment, the evaluation unit 112 as a weighting unit calculates the weight W1 to be attached to the road image data based on the detection value of the illuminance sensor 36. However, the weighting unit may calculate the weight W1 to be attached to the road image data based on the driving time information included in the driving information acquired by the information acquisition unit 111. More specifically, since the image recognition accuracy is lower at night (specifically, sunset to sunrise hours) than during the daytime, the evaluation unit 112 may attach a smaller weight W1 when the driving time period of the vehicle 20 includes nighttime than when the driving time includes daytime. Note that the larger the percentage of nighttime hours included in the driving time period of the vehicle 20, the smaller the weight W1 may be. In the above embodiment, the illuminance sensor 36 detects the illuminance around the vehicle 20, but the illuminance around the vehicle 20 may be detected based on the captured image of the camera 37.

Furthermore, in the above embodiment, the output unit 113 stores the road surface roughness value calculated by the evaluation unit 112 in association with the road information included in the map information in the memory unit 120. However, the output unit may store the road surface roughness value in association with the information of the road such that information indicating the road surface roughness value (text information or color information) is superimposed on the position of the road to be evaluated. In the above embodiment, the output unit 113 as an update unit updates the roughness value corresponding to the road stored in the memory unit 120 based on the evaluation result of the evaluation unit 112, but the update unit may store information indicating that the roughness value has been updated in the memory unit 120 in association with the roughness value when the roughness value is updated.

The above embodiment can be combined as desired with one or more of the above modifications. The modifications can also be combined with one another.

The present invention allows accurate evaluation of the condition of the road surface.

Above, while the present invention has been described with reference to the preferred embodiments thereof, it will be understood, by those skilled in the art, that various changes and modifications may be made thereto without departing from the scope of the appended claims.

What is claimed is:

1. A road surface evaluation apparatus comprising
a microprocessor and a memory connected to the microprocessor, wherein
the memory stores map information including roughness information indicating a roughness of a surface of a road, and
the microprocessor is configured to perform:
acquiring as driving information of a plurality of vehicles driving on the road, position information of the plurality of vehicles, acceleration information indicating accelerations of the plurality of vehicles, driving image information including a captured image of the surface of the road, and driving sound information indicating driving sound of the plurality of vehicles;
evaluating the roughness of the surface of the road based on the driving information of the plurality of vehicles;
updating the roughness information corresponding to the road stored in the memory based on an evaluation result in the evaluating; and
outputting information on the evaluation result in association with the road information to at least a terminal or a display.

2. The road surface evaluation apparatus according to claim 1, wherein
the microprocessor is configured to further perform
acquiring external environment information indicating an external environment of the plurality of vehicles driving on the road, and
the microprocessor is configured to perform
in the evaluating, attaching a weight to the acceleration information, the driving image information, and the driving sound information to be used for the evaluating of the roughness of the surface of the road, and
in the attaching, changing the weight attached to the acceleration information, the driving image information, and the driving sound information based on the external environment information.

3. The road surface evaluation apparatus according to claim 2, wherein
the external environment information includes illuminance information indicating an illuminance outside the plurality of vehicles driving on the road, and
the microprocessor is configured to perform
in the attaching, decreasing, in a case where the illuminance indicated by the illuminance information is equal to or less than a predetermined value, the weight attached to the driving image information than in a case where the illuminance is larger than the predetermined value.

4. The road surface evaluation apparatus according to claim 2, wherein
the external environment information includes illuminance information indicating an illuminance outside the plurality of vehicles driving on the road, and
the microprocessor is configured to perform
in the attaching, decreasing the weight attached to the driving image information as the illuminance indicated by the illuminance information decreases.

5. The road surface evaluation apparatus according to claim 2, wherein
the position information includes a driving position of each of the plurality of vehicles driving on the road and a time at the driving position of each of the plurality of vehicles, and
the microprocessor is configured to perform
in the attaching, decreasing the weight attached to the driving image information as a percentage of nighttime hours included in a driving time period indicated by the position information is larger.

6. The road surface evaluation apparatus according to claim 2, wherein
the external environment information includes weather information indicating weather when the vehicles of the plurality are driving on the road,
the microprocessor is configured to perform
in the attaching, decreasing, in a case where the weather indicated by the weather information is bad weather, the weight attached to the driving image information compared to a case where the weather is not the bad weather, and
the bad weather includes rainfall, snowfall, snow cover, or fog.

7. The road surface evaluation apparatus according to claim 6, wherein
the microprocessor is configured to perform
in the evaluating, removing a noise included in the driving sound information by a spectrum analysis based on the weather information to use the driving sound information from which the noise is removed to evaluate the roughness of the surface of the road.

8. The road surface evaluation apparatus according to claim 7, wherein
the microprocessor is configured to perform
in the removing, removing the noise caused by the weather indicated by the weather information from the driving sound information by the spectrum analysis.

9. The road surface evaluation apparatus according to claim 1, wherein
the driving information includes
driving speed information indicating a driving speed of each of the plurality of vehicles calculated based on a temporal transition of a driving position of each of the plurality of vehicles indicated by the position information, or
a measured value of the driving speed of each of the plurality of vehicles transmitted from each of the plurality of vehicles, and
the microprocessor is configured to perform
in the evaluating, removing, based on the driving speed information or the measured value of the driving speed, a noise included in the driving sound information according to a speed band by a spectrum analysis to use the driving sound information from which the noise is removed to evaluate the roughness of the surface of the road.

10. The road surface evaluation apparatus according to claim 1, wherein
the microprocessor is configured to perform
in the outputting, when receiving an output instruction from the terminal, outputting the information on the evaluation result in association with the road information to the terminal.

* * * * *